United States Patent
Ludwinski et al.

(10) Patent No.: US 11,817,004 B2
(45) Date of Patent: *Nov. 14, 2023

(54) MACHINE-IMPLEMENTED FACIAL HEALTH AND BEAUTY ASSISTANT

(71) Applicant: L'OREAL, Paris (FR)

(72) Inventors: Celia Ludwinski, Clark, NJ (US); Florent Valceschini, Clark, NJ (US); Yuanjie Li, San Francisco, CA (US); Zhiyuan Song, San Francisco, CA (US); Christine El-Fakhri, New York, NY (US); Hemant Joshi, San Francisco, CA (US)

(73) Assignee: L'OREAL, Paris (FR)

( * ) Notice: Subject to any disclaimer, the term of this patent is extended or adjusted under 35 U.S.C. 154(b) by 308 days.

This patent is subject to a terminal disclaimer.

(21) Appl. No.: 17/212,068

(22) Filed: Mar. 25, 2021

(65) Prior Publication Data

US 2021/0209427 A1 Jul. 8, 2021

Related U.S. Application Data

(63) Continuation of application No. 16/241,425, filed on Jan. 7, 2019, now Pat. No. 10,990,858.

(60) Provisional application No. 62/614,080, filed on Jan. 5, 2018.

(51) Int. Cl.
| | |
|---|---|
| *G06K 9/66* | (2006.01) |
| *G09B 19/00* | (2006.01) |
| *G06V 40/16* | (2022.01) |
| *G06F 18/40* | (2023.01) |
| *G06F 18/2413* | (2023.01) |
| *G06V 10/764* | (2022.01) |

(52) U.S. Cl.
CPC ..... *G09B 19/0076* (2013.01); *G06F 18/2413* (2023.01); *G06F 18/41* (2023.01); *G06V 10/764* (2022.01); *G06V 40/166* (2022.01); *G06V 40/168* (2022.01); *G06V 40/172* (2022.01); *G09B 19/00* (2013.01)

(58) Field of Classification Search
CPC .. G06K 9/66; G06K 9/00255; G06K 9/00268; G06K 9/00288; G06K 9/6254; G06K 9/627; G09B 19/00; G09B 19/0076
See application file for complete search history.

(56) References Cited

U.S. PATENT DOCUMENTS

| | | | | |
|---|---|---|---|---|
| 2003/0065589 A1* | 4/2003 | Giacchetti | ............... | G06T 11/00 705/26.1 |
| 2003/0065636 A1* | 4/2003 | Peyrelevade | ........ | A45D 44/005 706/62 |
| 2010/0185064 A1* | 7/2010 | Bandic | .................. | A61B 5/444 600/306 |
| 2014/0201126 A1* | 7/2014 | Zadeh | .................... | A61B 5/165 706/52 |
| 2017/0178220 A1* | 6/2017 | Chong | .................. | G06Q 50/01 |
| 2017/0270593 A1* | 9/2017 | Sherman | .............. | G06V 40/171 |

(Continued)

*Primary Examiner* — Fayyaz Alam
(74) *Attorney, Agent, or Firm* — Oblon, McClelland, Maier & Neustadt, L.L.P.

(57) ABSTRACT

An image is accepted by one or more processing circuits from a user depicting the user's facial skin. Machine learning models stored in one or more memory circuits are applied to the image to classify facial skin characteristics. A regimen recommendation is provided to the user based on the classified facial skin characteristics.

9 Claims, 7 Drawing Sheets

(56) References Cited

U.S. PATENT DOCUMENTS

| | | | |
|---|---|---|---|
| 2018/0014777 A1* | 1/2018 | Amir | A61B 5/4839 |
| 2018/0042566 A1* | 2/2018 | Roffë | A61B 6/4441 |
| 2018/0114334 A1* | 4/2018 | Desai | G06V 10/82 |
| 2018/0125201 A1* | 5/2018 | Nichols | H04N 23/69 |
| 2018/0350071 A1* | 12/2018 | Purwar | G06V 10/454 |
| 2019/0213227 A1* | 7/2019 | Ludwinski | A61B 5/0077 |
| 2019/0213452 A1* | 7/2019 | Ludwinski | G06V 40/172 |
| 2020/0280680 A1* | 9/2020 | Nichols | H04N 23/69 |

\* cited by examiner

MACHINE-IMPLEMENTED FACIAL HEALTH AND BEAUTY ASSISTANT

CROSS-REFERENCE TO RELATED APPLICATIONS

This application is a continuation of and claims the benefit of priority under 35 U.S.C. § 120 from U.S. application Ser. No. 16/241,425 filed Jan. 7, 2019, and claims the benefit of priority from U.S. Provisional Application No. 62/614,080 filed Jan. 5, 2018, the entire contents of each of which are incorporated herein by reference.

BACKGROUND

The health and beauty industry leverages advances in technology to improve the consumer experience with their products and services. Certain websites, for example, now avail themselves of facial recognition techniques that locate features (eyes, cheeks, nose, lips, chin, etc.) of the human face provided through a mobile device. Such computer vision techniques fail to embrace the full capabilities of machine learning, particularly where customization to particular consumers is concerned. That is, for one thing, conventional health and beauty portals lack the mechanisms by which a regimen is recommended by machine, as opposed to recommended by a human clinician. In an embodiment, a regimen is a systematic plan or course of action intended to improve the health and/or beauty of a human user. In the facial health and beauty domain, a regimen might include cleaning the skin with a specific cleanser and applying specific creams, adhering specific dietary constraints, changing sleep habits, etc.

Conventional health and beauty portals also lack the mechanisms by which features of a user's skin can be tracked over time, such as to observe the efficacy of the recommended regimen. They lack sufficient information explanation and advice, are not targeted separately for men and women, and suffer from false positives in detecting certain conditions (hair misidentified as wrinkles, for example). The ability to recommend a health and/or beauty regimen through data analysis, as well as to track individual users' progress through that regimen by data analysis has yet to be realized on a machine.

SUMMARY

One or more images are accepted by one or more processing circuits from a user depicting the user's facial skin. In an embodiment, machine learning models stored in one or more memory circuits are applied to the one or more images to classify facial skin characteristics, identify significant objects, determine beauty trends, and the like. In an embodiment, a regimen recommendation is provided to the user based on the classified facial skin characteristics.

In an embodiment, an apparatus is provided comprising: a processing circuit to accept at least one image depicting facial skin of a user; a communication circuit to convey the accepted image to machine learning models and to receive a regimen recommendation from the machine learning models; and a user interface circuit to present the regimen recommendation to the user.

In an embodiment, the processing circuit is further configured to: alert the user that another image depicting the user's facial skin is required according to a predefined schedule; accept the other image from a user depicting the user's facial skin; the communication circuit being further configured to convey the other image to the machine learning models and to receive an updated regimen recommendation from the machine learning models; and the user interface circuit being further configured to present the updated regimen recommendation to the user.

In an embodiment, the user interface circuit is further configured to present images of human faces to the user; the processing circuit being further configured to accept input from the user that classifies facial skin characteristics from the images provided thereto through the user interface circuit; and the communication interface circuit being further configured to convey the user input to the machine learning models as training data.

In an embodiment, the user interface circuit is further configured to present a user control by which the facial skin characteristics are rated on a predetermined scale.

In an embodiment, the apparatus includes a camera communicatively coupled to the processing circuit to provide the image from the user thereto.

In an embodiment, the camera, the processing circuit, the user interface circuit and the communication circuit are components of a smartphone.

In an embodiment, a method is provided comprising: accepting at least one image depicting facial skin of a user; conveying the accepted image to machine learning models; receiving a regimen recommendation from the machine learning models; and presenting the regimen recommendation to the user.

Figure 1:
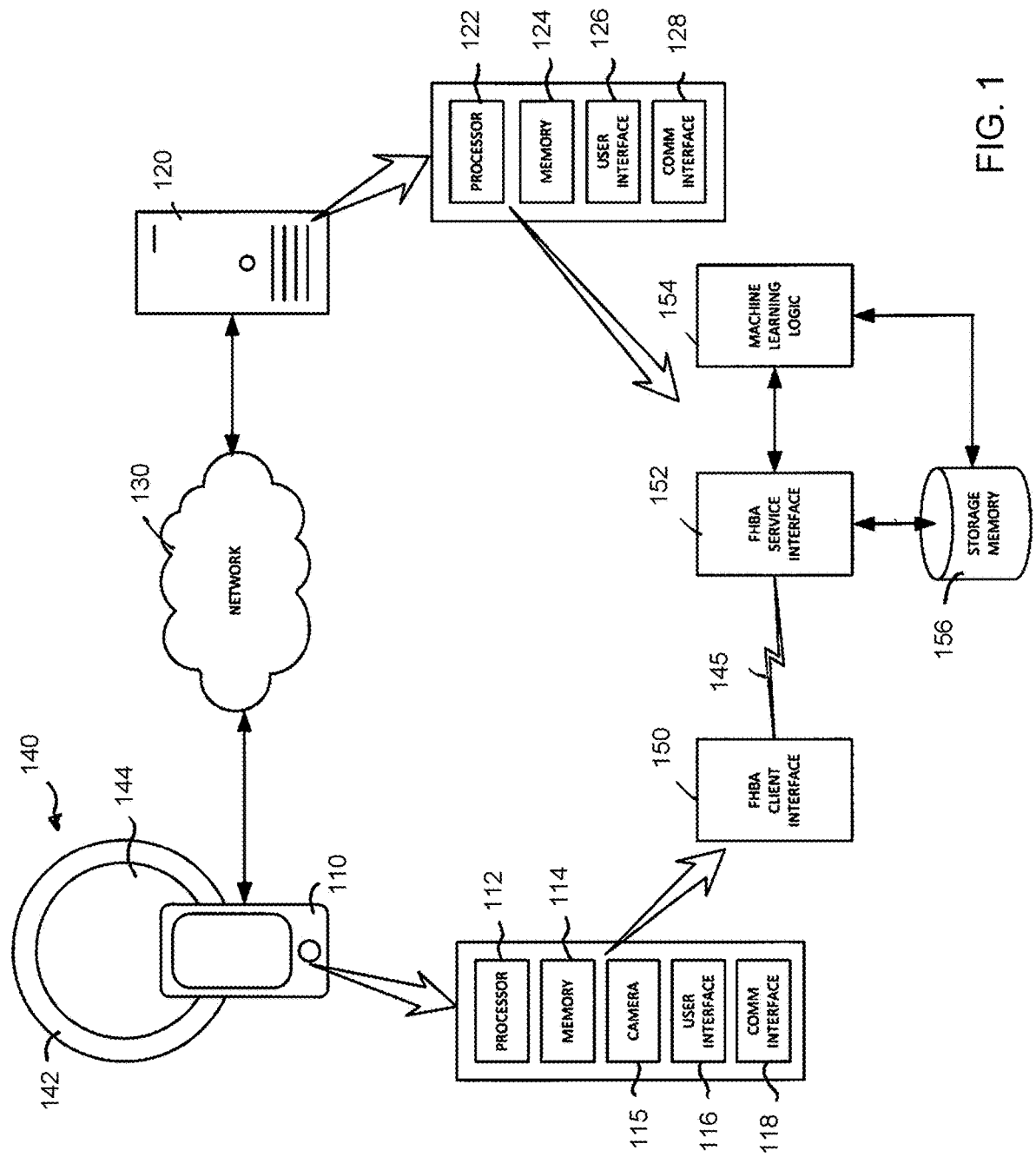
FIG. 1 is a schematic block diagram of an example system configuration by which the present general inventive concept can be embodied.

The present inventive concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

DESCRIPTION

FIG. 1 is a schematic block diagram of an exemplary facial health and beauty assistant (FHBA) system 100 comprising an FHBA client platform 110 and an FHBA service platform 120 communicatively coupled through a network 130. In one embodiment, FHBA client platform 110 is a smartphone, tablet computer or other mobile computing device, although the present invention is not so limited. As illustrated in FIG. 1, exemplary FHBA client platform 110 comprises a processor 112, memory 114, a camera 115, a user interface 116 and a communication interface 118 over which an FHBA client interface 150 may be implemented. FHBA client interface 150 provides the primary portal through which a user accesses FHBA system 100.

In one embodiment of the present invention, FHBA service platform 120 comprises one or more server computers, each comprising a processor 122, a memory 124, a user interface 126 and a communication interface. These resources of FHBA service platform 120 may be utilized to implement an FHBA service interface 152, machine learning logic 154 and a storage memory 156. Storage memory 156 represents a sufficient amount of volatile and persistent memory to embody the invention. Storage memory 156 may contain vast amounts of encoded human knowledge as well as space for the private profile of a single user. Storage memory 156 may further store processor instructions that, when executed by one or more processors 122, perform some task or procedure for embodiments of the invention. Storage memory 156 may further store user models (coefficients, weights, processor instructions, etc.) that are operable with machine learning logic 154 to prescribe a particular regimen for a user and track the user's progress under the regimen.

Exemplary FHBA service interface 152 provides the infrastructure by which network access to FHBA services are both facilitated and controlled. FHBA client interface 150 and FHBA service interface 152 communicate via a suitable communication link 145 using the signaling and data transport protocols for which communication interface 118 and communication interface 128 are constructed or otherwise configured. FHBA service interface 156 may implement suitable Internet hosting services as well as authentication and other security mechanisms that allow access only to authorized users and protect the users' private data. Additionally, FHBA service interface 152 may realize an application programming interface (API) that affords FHBA client interface 150 communication with, for example, machine learning logic 154. Those having skill in the art will recognize other front-end services that can be used in conjunction with the present invention.

Machine learning logic 154 provides the infrastructure for embodiments of the invention to learn from and make predictions about data without being explicitly programmed to do so. In certain embodiments, machine learning logic 154 implements one or more convolutional neural networks (CNNs), the models for which may be trained using open source datasets or crowdsourced data sets, as explained below. Other machine learning techniques may be used in conjunction with the present invention including, but not limited to, decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning and learning classifiers. Additional techniques described in U.S. Pat. Nos. 8,442,321, 9,015,083, 9,536,293, 9,324,022, and U.S. PG Publication No. 2014/0376819 A1, all of which are incorporated herein by reference, may be used with the present invention. In the descriptions that follow, it will be assumed that machine learning logic implements a convolutional neural network, although the present invention is not so limited. Those having skill in artificial intelligence will recognize numerous techniques that can be used in conjunction with the present invention without departing from the spirit and intended scope thereof.

Embodiments of the invention determine various regimens for a user based on images of the user taken by camera 116 on FHBA client platform 110. In certain embodiments, the images of the user's face are preferably obtained under conditions of uniform lighting that is consistent over time. To that end and referring to FIG. 1, embodiments of the invention provide for a mirror device 140 that includes mirror surface 144 circumscribed by a ring illuminator 142. This configuration is intended to define a temporally constant standard of illumination. When the invention is so embodied, temporally varying characteristics in images a user's face are more readily recognized and labeled.

Figure 2:
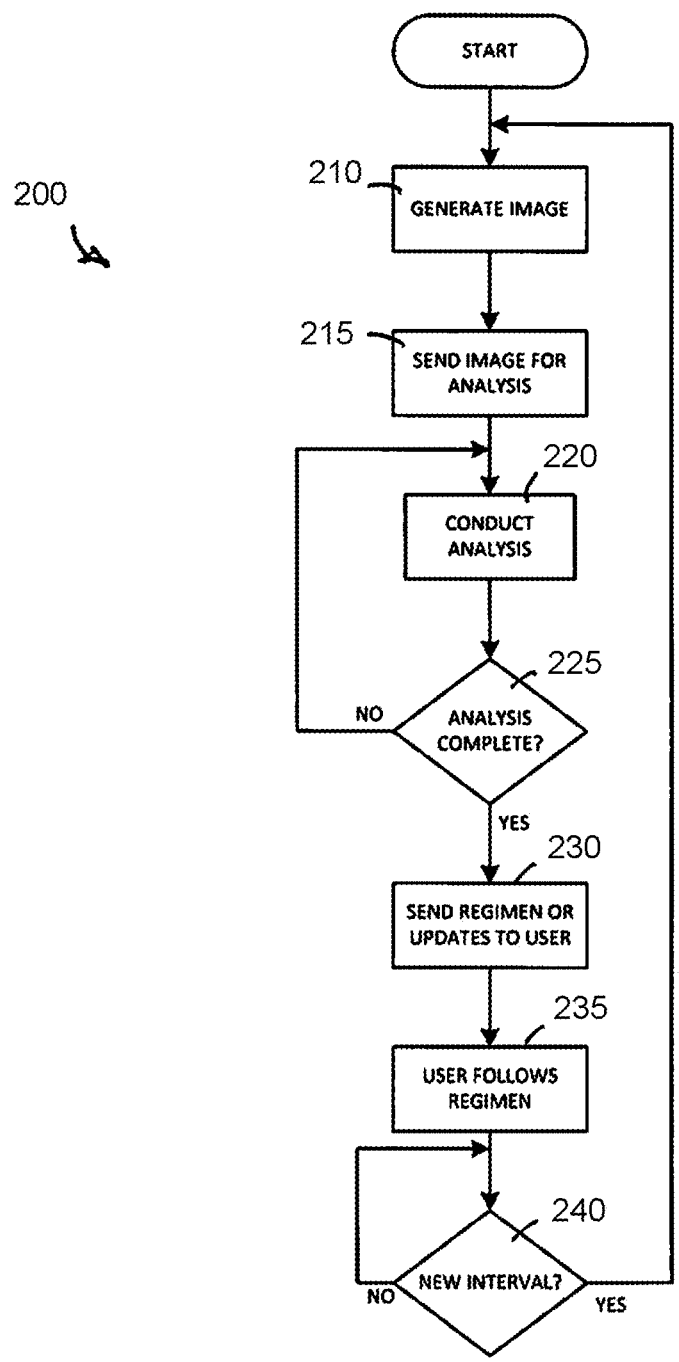
FIG. 2 is a flow diagram of a simple user interaction with an embodiment of the present general inventive concept.

FIG. 2 is a flow diagram by which an example interaction with an embodiment of the invention can be explained. The interaction of FIG. 2 is simple by design and is no way intended to be limiting. The description of FIG. 2 is intended to illustrate functionality of the configuration illustrated in FIG. 1. Further features of the invention, beyond those described with reference to FIG. 2, will be discussed below.

In operation 210, a user may generate an image of his face, such as by camera 116 of FHBA client platform 110. This may be achieved with or without the illumination standard discussed above. In operation 215, the user's image is sent to FHBA service platform 120. This may be achieved by suitable communication protocols shared between FHBA client platform 110 and FHBA service platform 120 to realize communication link 145.

In operation 220, image analysis and machine learning is conducted to analyze the user's skin from the images. Machine learning logic 154 may perform analyses that determine, among other things, apparent age, i.e., the subjective age of the user estimated from a visual appearance of the user's face; evenness of facial skin tone (is there blotching, age/sun spots, acne scarring and other blemishes); the presence of stress as seen in under eye puffiness, dark circles, overall tone drooping in eyelids/corners of the mouth, fine lines and eye redness; hydration level, often referred to as plump or slick, which presents as a lack of ashy-ness, skin flaking, dullness and fine lines; shine—a nonlinear parameter where the ideal is a moderate amount of shine; condition of pores—a reduced appearance of pores is desirable as it provides a healthy, youthful and smooth skin texture; the presence of acne as characterized by red/inflamed pimples and scarring; the presence of wrinkles, a fold, ridge or crease in the skin may be discovered through the analysis; the presence of sagging, i.e., a droopy appearance of soft tissue caused by elasticity reduction and the presence of crow's feet, a branching wrinkle specifically located at the outer corner of a person's eye. Other conditions of the skin may be determined by machine learning logic 154. Further details of the analyses are provided below. Once the analyses have been completed, as determined in operation 225, process 200 may transition to operation 220, whereby the analyses results and the prescribed regimen (products and routines) and/or updates to the regimen are sent to the user via FHBA client interface 150.

In operation 225, it is determined whether the analysis is complete and, responsive to a positive determination thereof, process 200 may transition to operation 230, whereby FHBA service interface 152 sends a recommended regimen or updates to a regimen to FHBA client interface 150 in operation 230. The user may follow the regimen as indicated in operation 235 and, in operation 240 it is determined whether a new interval has commenced. If so, process 200 reiterates from operation 210. FHBA client interface 150 may access calendars and timers (as well as GPS) onboard FHBA client platform 110 as well as access to network-accessible calendars on network 130. Accordingly, once a week, say, FHBA client interface 150 may remind the user to take a picture of his face, i.e., remind him of the new interval. Over time, FHBA system 100 can determine from the images taken at each interval whether the recommended regimen is working and, if not, FHBA system 100 may revise the regimen, e.g., change a product, recommend further lifestyle changes, make a doctor's appointment, etc.

Figure 3:
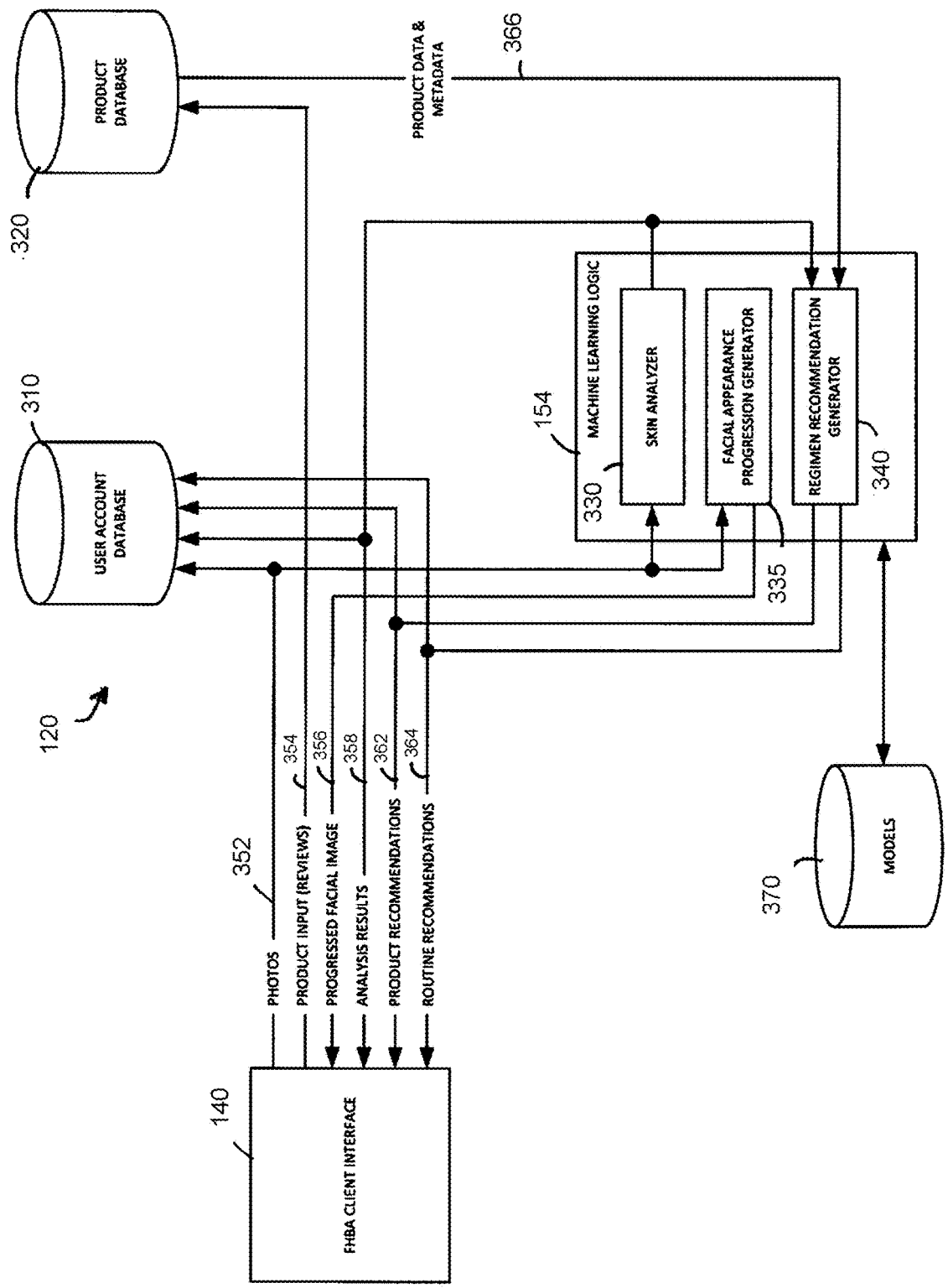
FIG. 3 is a schematic block diagram of example data flow of an embodiment of the present general inventive concept.

FIG. 3 is a diagram of data flow between an exemplary FHBA client interface 150 and services of FHBA service platform 120. It should be noted that, in FIG. 3, FHBA service interface 152 has been omitted to avoid unnecessary congestion in the figure. However, those having skill in the relevant arts will recognize the operation of an FHBA service interface 152 to control and facilitate the data flow depicted in FIG. 3.

As illustrated in FIG. 3, machine learning logic 154 may comprise a skin analyzer 330, facial appearance progression generator 335 and a regimen recommendation generator 340 and may be communicatively coupled to a user account database 310 and a product database 320. Machine learning logic 154 may train and utilize machine learning models 370 to recommend regimens and to track the progress of the user under the regimen. As those skilled in machine learning will attest, training may involve selecting a set of features, e.g., apparent age, evenness, stress, hydration, shine, pores, acne, wrinkles, sagging, crow's feet, etc., and assigning labels to image data that reflects the presence or prominence of those features. The assigning of labels may be performed by a subject matter expert or, as explained below, through crowdsourced data. Taking the assigned labels as ground truth, machine learning logic 154 may configure models 370 to predict the degree to which the features are present in a test image, which may change over time. The present invention is not limited to a particular model representation, which may include binary models, multiclass classification models, regression models, etc.

Exemplary user account database 310 contains the data of all users of FHBA system 100 in a secure manner. This includes user profile data, current and past user photos 357 for each user, current and past skin analyses 358 for each user, current and past product recommendations 362 and current and past routine recommendations 364 for each user.

Exemplary product database 320 contains the data of different products that can be used in a regimen. Product database 320 may contain records reflecting the product names, active and inactive ingredients, label information, recommended uses, and so on. In certain embodiments, illustrated as product input 354, the user (and other users of FHBA system 100) may provide feedback on different products and may enter products not already in product database 320. The present invention is not limited to particular products that can be entered in product database 320.

Skin analyzer 330 is constructed or is otherwise configured to classify various skin conditions or artifacts from imagery of a user's face using machine learning techniques over models 370. In certain embodiments, photographic images 352 of a user's face are provided to skin analyzer 330 for analysis. Skin analyzer 330 may implement image preprocessing mechanisms that include cropping, rotating, registering and filtering input images prior to analysis. After any such preprocessing, skin analyzer 330 may apply models 370 to the input image 357 to locate, identify and classify characteristics of the user's facial skin.

Facial appearance progression generator 335 may operate on the user's facial images to portray how the user's face would appear sometime in the future. Such progression may be in age, for which age progression techniques may be deployed, or may be in appearance resulting from adherence to a regimen. A progressed image 356 may be provided to the user through FHBA client interface 150.

Regimen recommendation generator 340 may operate on analysis results 358 obtained from skin analyzer 430 towards prescribing a regimen to the user. Models 370 may be trained to predict what products and routines (treatment, cosmetic and lifestyle recommendations, etc.) would be effective in meeting the user's goal with regard to facial skin characteristics identified in the skin analysis. Regimen recommendation generator 340 may format the analysis results 358 of skin analyzer 330 as a query into, for example, product database 320 based on knowledge encoded on models 370. In response, product database 320 may return product data and metadata 366, and product recommendations 362 and routine recommendations 364 may be provided to FHBA client interface 150.

Figure 4:
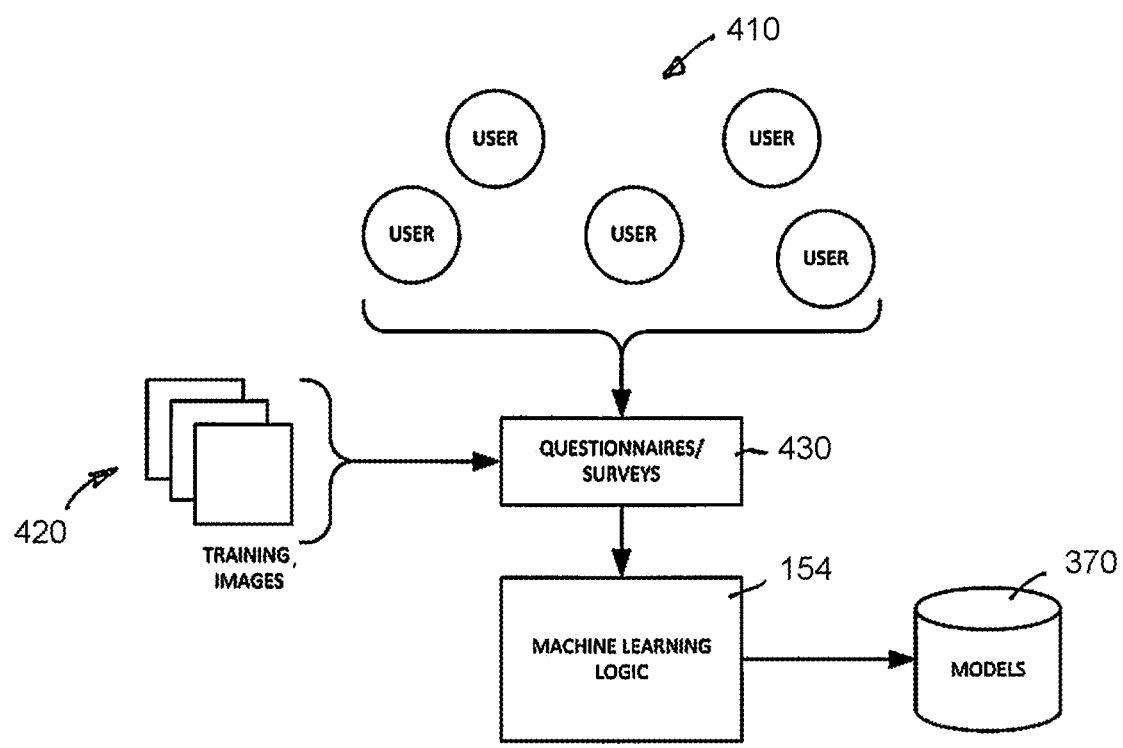
FIG. 4 is a block diagram of crowdsourced training of machine learning models according to an embodiment of the present general inventive concept.

As indicated above, training of models 370 may be achieved by labeling of image data by an expert. However, in lieu of an expert, certain embodiments of the invention utilize crowdsourced data as training data. FIG. 4 is a diagram of such an embodiment of the invention. During training, users 410 are presented a set of training images 420 over which they are asked to characterize facial skin characteristics and/or facial features. In one embodiment, a suitable scale is constructed, (e.g., integers 1-10) with which users can rate the severity or prominence of the feature. For example, each of users 410 (over time) are presented a large number of facial images and is walked through a set of questions regarding features and/or skin characteristics of the person in the image. Using the scale (1-10), each user 410 is asked to rate the prominence of each of the features (e.g., apparent age, evenness, stress, hydration, shine, pores, acne, wrinkles, sagging, crow's feet, etc.). The answers to the questions may serve as labels used for training machine language logic 154.

Figure 5:
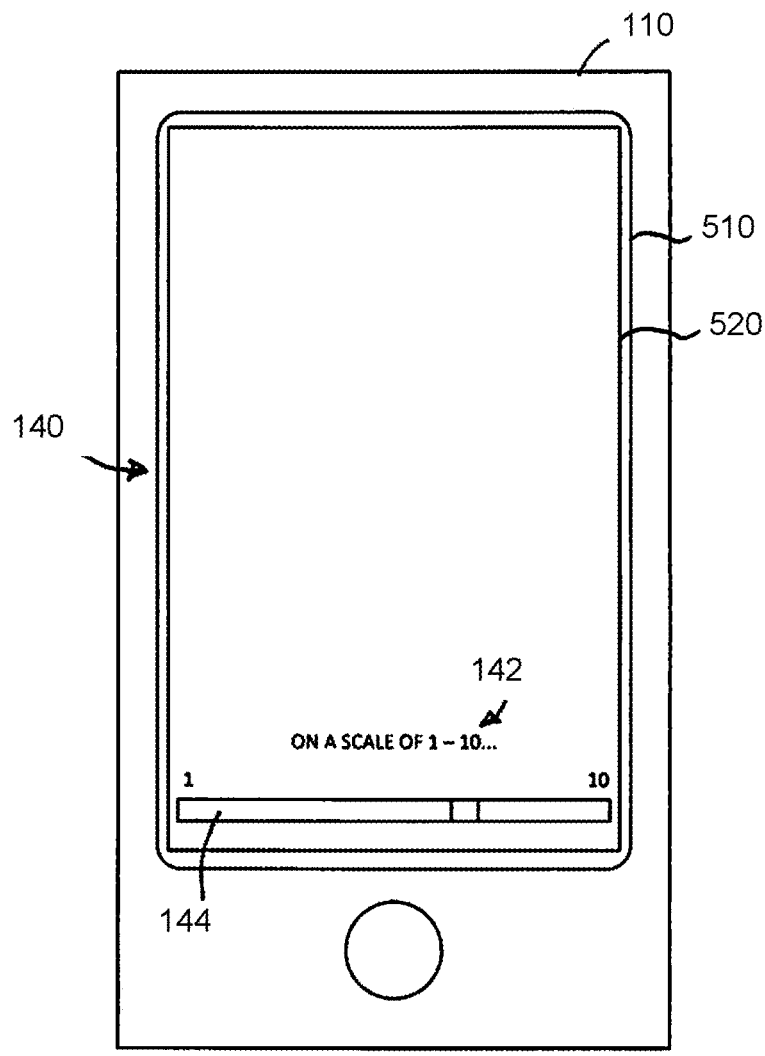
FIG. 5 is a diagram of an example client platform device on which the present general inventive concept can be embodied.

Referring to FIG. 5, there is illustrated an exemplary FHBA client platform 110 in the form of a smartphone having a touchscreen 510 as user interface 118. Exemplary FHBA client interface 150 is implemented on the computational resources of FHBA client platform 110 as discussed with reference to FIG. 1. FHBA client interface 150 may present a photograph of a person's face in image area 520 and may present via text 142 "On a scale from 1-10, where "1" means 'invisible' and "10" for 'prominently present,' how would you rate the presence this person's crow's feet?" A suitable user interface control 144 (slider control illustrated in FIG. 5) may be implemented on FHBA client interface 150 that allows a user to input its rating.

Figure 6:
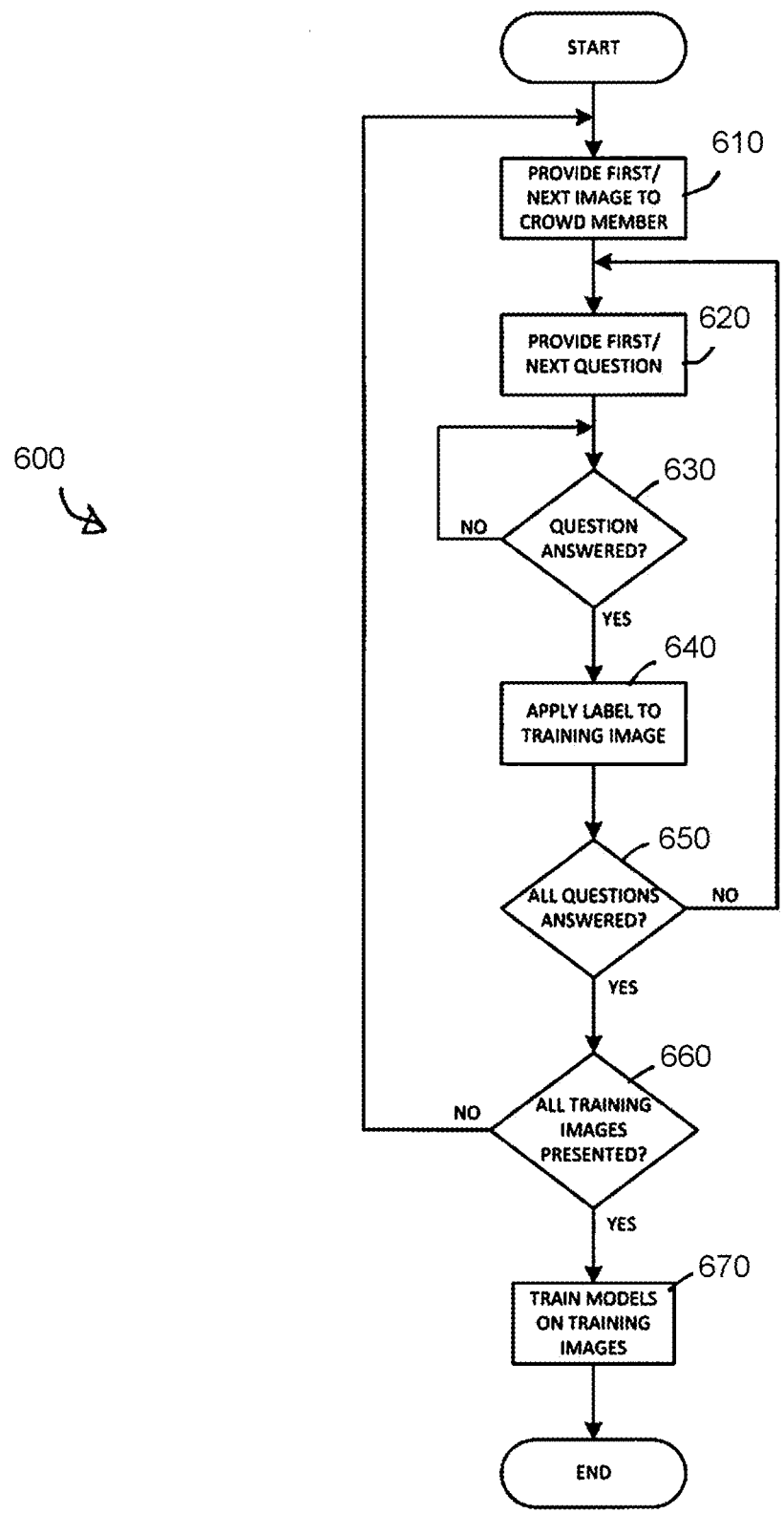
FIG. 6 is a flow diagram of example crowdsourced training of machine learning models according to an embodiment of the present general inventive concept.

FIG. 6 is a flow diagram of a crowdsourced training process 600 with which the present invention may be embodied. In operation 610, a training image may be provided to FHBA client interface 150. A set of training images 420 may have been preselected as including illustrative examples of the skin characteristics of interest. In operation 620, the user is provided with a first question and waits for an answer (rating) in operation 630. Such question might be, for example, "On a scale of 1 to 10, where '1' is 'invisible' and '10' is "highly prominent," how would you rate this models acne?" When the user has answered the question, as determined in operation 630, the user's answer may be formatted into a label suitable for machine training of machine learning logic 154 in operation 640. In operation 650, it is determined whether all questions relating to the currently displayed image have been answered. If not, process 600 may transition to back to operation 620, whereby the next question is presented. If all questions have been answered, as determined at operation 650, it is determined in operation 560 whether all training images have been presented. If not, process 600 may transition to back to operation 610, whereby the next training image is presented. If all training images have been presented, as determined at operation 660, the labeled images may be used to train models 370 in operation 670.

It is to be understood that all iterations in process 600, e.g., presenting next questions in operations 620 and 650 and/or presenting next images in operations 610 and 660, need not be performed in any one sitting. For example, the user may be prompted to answer a single question at a time (e.g., every time the user logs on) and it is only over time that all questions and images are presented to any one user. Alternatively, users may be selected to answer all questions for all images in a single sitting. Over a large number of users and/or facial images, many labels may be generated for training models 370, where the statistical trends underlying such training reflect public views as opposed to those of a human expert.

Figure 7:
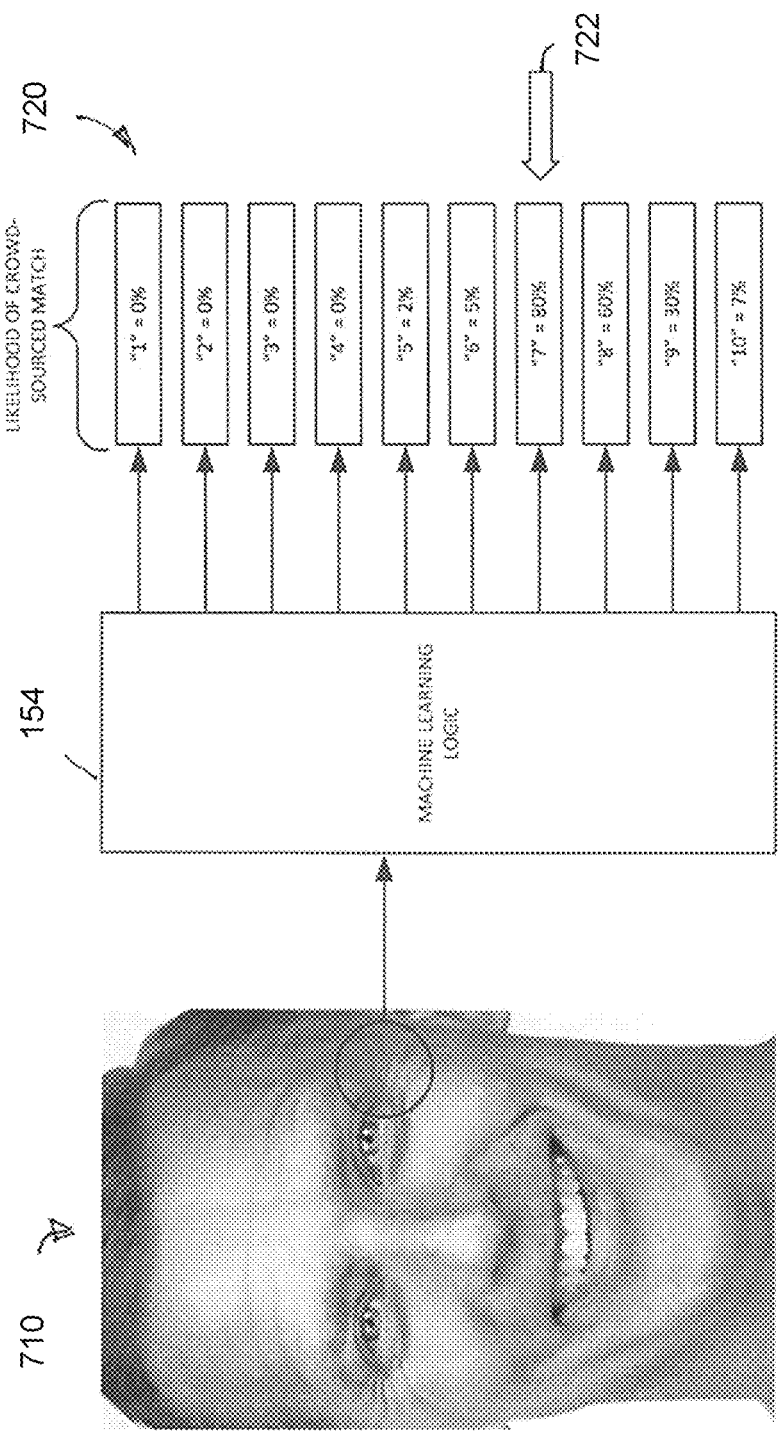
FIG. 7 is a diagram illustrating a test operation in accordance with the crowdsourced machine learning model training.

FIG. 7 illustrates an example test operation in accordance with the crowdsourced training discussed above. A test image 710, i.e., a user's own image, may be presented to machine learning logic 154, which analyzes the image per the models trained on the crowdsourced data 720. As illustrated in the figure, machine learning logic 154 estimates that 80% of people surveyed would rate the user's crow's feet a 7 out of 10 in terms of prominence, as indicated at 722. Accordingly, machine learning logic 154 may recommend a regimen, (e.g., a cream specially formulated for crow's feet and recommended application instructions), based on the severity score of 7.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, e.g., an object oriented programming language such as Java, Smalltalk, C++ or the like, or a conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). It is to be understood that the software for the computer systems of the present invention embodiments may be developed by one of ordinary skill in the computer arts based on the functional descriptions contained in the specification and flow charts illustrated in the drawings. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

The foregoing examples are illustrative of certain functionality of embodiments of the invention and are not intended to be limiting. Indeed, other functionality and other possible use cases will be apparent to the skilled artisan upon review of this disclosure.

The invention claimed is:

1. An apparatus comprising:
   a processing circuit to accept at least one image depicting facial skin of a user;
   a communication circuit to convey the accepted image to machine learning models and to receive a regimen recommendation from the machine learning models; and
   a user interface circuit to present the regimen recommendation to the user,
   wherein the user interface circuit is further configured to present images of human faces to the user;

the processing circuit being further configured to accept input from the user that classifies facial skin characteristics from the images provided thereto through the user interface circuit; and the communication interface circuit being further configured to convey the user input to the machine learning models as training data, wherein the input from the user that classifies facial skin characteristics from the images provided is a number within a number scale range that represents a magnitude of the facial skin characteristics to be classified.

2. The apparatus according to claim 1, wherein the images of human faces presented to the user are preselected as including illustrative examples of skin characteristics of interest.

3. The apparatus according to claim 1, wherein the input from the user is formatted into a label adapted for at least one of the machine learning models.

4. The apparatus according to claim 1, wherein the input from the user that classifies facial skin characteristics from the images is requested from the user at every instance of the user togging into the apparatus.

5. A method, implemented by an apparatus having circuitry, comprising:

accepting, by a processing circuit, at least one image depicting facial skin of a user;

conveying, by a communication circuitry, the accepted image to machine learning models and to receive a regimen recommendation from the machine learning models; and presenting, by a user interface circuit, the regimen recommendation to the user, wherein the user interface circuit present images of human faces to the user;

the processing circuit accepts input from the user that classifies facial skin characteristics from the images provided thereto through the user interface circuit; and the communication interface circuit conveys the user input to the machine learning models as training data, wherein the input from the user that classifies facial skin characteristics from the images provided is a number within a number scale range that represents a magnitude of the facial skin characteristics to be classified.

6. The method according to claim 5, wherein the images of human faces presented to the user are preselected as including illustrative examples of skin characteristics of interest.

7. The method according to claim 5, wherein the input from the user is formatted into a label adapted for at least one of the machine learning models.

8. The method according to claim 5, wherein the input from the user that classifies facial skin characteristics from the images is requested from the user at every instance of the user logging into the apparatus.

9. A non-transitory computer readable medium that stores a program that when executed by a computer, causes the computer to perform a method comprising:

accepting, by a processing circuit, at least one image depicting facial skin of a user;

conveying, by a communication circuitry, the accepted image to machine learning models and to receive a regimen recommendation from the machine learning models; and presenting, by a user interface circuit, the regimen recommendation to the user, wherein the user interface circuit present images of human faces to the user;

the processing circuit accepts input from the user that classifies facial skin characteristics from the images provided thereto through the user interface circuit; and the communication interface circuit conveys the user input to the machine learning models as training data, wherein the input from the user that classifies facial skin characteristics from the images provided is a number within a number scale range that represents a magnitude of the facial skin characteristics to be classified.

* * * * *